United States Patent [19]

Pötz et al.

[11] 4,340,476
[45] Jul. 20, 1982

[54] ARRANGEMENT FOR MOUNTING DIVIDING OR SEPARATING ELEMENTS IN A FILTERING WATER SEPARATOR

[75] Inventors: Karl Pötz, Oberursel; Rudolf Schütz, Königstein-Falkenstein, both of Fed. Rep. of Germany

[73] Assignee: Faudi Feinbau GmbH, Oberursel, Fed. Rep. of Germany

[21] Appl. No.: 271,180

[22] Filed: Jun. 8, 1981

[30] Foreign Application Priority Data

Jun. 27, 1980 [DE] Fed. Rep. of Germany ....... 3024106

[51] Int. Cl.³ .......................................... B01D 27/00
[52] U.S. Cl. ................................................. 210/232
[58] Field of Search ............. 210/232, 237, 238, 323.2, 210/340, 341, 416.5, 437, 457, 458

[56] References Cited

U.S. PATENT DOCUMENTS

| | | | |
|---|---|---|---|
| 2,266,414 | 12/1941 | Dahl | 210/232 |
| 2,366,451 | 1/1945 | McNeal | 210/232 |
| 3,165,469 | 1/1965 | Bruns | 210/232 |
| 3,241,679 | 3/1966 | Walter | 210/232 |
| 3,440,802 | 4/1969 | Rosaen | 210/238 |
| 3,747,765 | 7/1973 | Nowak | 210/238 |
| 4,132,641 | 1/1979 | Elsworth | 210/238 |
| 4,179,372 | 12/1979 | Rosaen | 210/238 |
| 4,303,518 | 12/1981 | Grosshandler | 210/238 |

FOREIGN PATENT DOCUMENTS

583427  9/1959  Canada ............................. 210/232

*Primary Examiner*—Ernest G. Therkorn
*Attorney, Agent, or Firm*—Michael J. Striker

[57] ABSTRACT

An arrangement for mounting elongated dividing or separating elements in a filtering water separator has a stationary mounting plate with a plurality of openings, a tensioning member axially abutting against the mounting plate, a central spindle member extending through the respective opening of the mounting plate and connected with the tensioning member and a receiving member arranged to receive an end of the dividing or separating element, axially abutting against the tensioning member, and including a flange part which is axially spaced from the mounting plate, and a projecting part extending with play into the opening of the mounting plate and sealed against the latter.

12 Claims, 2 Drawing Figures

ARRANGEMENT FOR MOUNTING DIVIDING OR SEPARATING ELEMENTS IN A FILTERING WATER SEPARATOR

BACKGROUND OF THE INVENTION

The present invention relates to an arrangement for mounting dividing or separating elements in a filtering water separator.

Arrangements of the above-mentioned general type are known in the art. A known arrangement has a mounting plate provided with cylindrical openings, a receiving flange member located at one end of each dividing or separating element and received in the respective opening as well as sealed against the mounting plate, and a central spindle member for tensioning both ends of each dividing or separating element and extending through the respective opening of the mounting plate and connected with a tensioning member which axially abuts against the mounting plate.

Such a filtering water separator is utilized, for example, for filtering out impurities in form of solid particles from a fuel and separating water contained therein. These filtering water separators must satisfy in practice very high requirements with respect to the dividing and separating output with simultaneous high throughput.

In the known arrangements several hollow cylindrical dividing elements and separating elements are arranged in a housing and mounted laterally on the mounting plate so as to subdivide the housing into an inlet chamber for a liquid to be cleaned, particularly for fuel to be cleaned, and a main chamber. The liquid flows through the perforated lateral receiving flange member of the dividing and separating elements and through the opening in the mounting plate. A seal arranged between the receiving flange member and the mounting plate prevents a leakage of not cleaned liquid. At the same time, the receiving flange member serves for mounting the dividing or separating elements on the mounting plate.

In the known filtering water separator, the dividing and separating elements are supported by an inner perforated supporting pipe. The dividing or separating element is screwed at its end facing toward the mounting plate to the receiving flange member which in turn is screwed to the mounting plate. When the filtering water separator is designed in accordance with the above-mentioned construction, the thread of the receiving flange member must be manufactured with higher accuracy, and the force transfer via the thread in the dividing or separating element encounters some difficulties.

In the known arrangements, the dividing or separating element is tensioned by a threaded central spindle between the receiving flange member and a flange member at the other end. The mounting plate is tensioned between the tightening member connected with the central spindle and the receiving flange member. In such a construction, highly sealed abutment of the receiving flange member against the mounting plate with interposition of a seal is guaranteed. At the same time the tensioning of the dividing or separating element with the aid of the central spindle provides for mounting of the dividing or separating element which, up to certain length of the elements, is sufficient to take up all operational loads.

The known filtering water separators must operate with ever-increasing throughputs in conditions of limited space which leads to development of the dividing or separating elements with increasing structural length. In this situation the above-mentioned mounting of the dividing or separating elements of the mounting plate is no longer suitable, particularly taking into account that the dividing or separating elements are usually arranged horizontally in the filtering water separator. The weight of the elements leads to undesirable bending in the region of their mounting on the mounting plate. When such filtering water separators are built, for example, in wing tank cars, vertical accelerations which take place during the operation lead to an additional bending load in the region of mounting. For this reason the respective international uniform regulations for such filtering water separators make the requirements that when the dividing or separating elements exceed a certain length, they must also be supported at the end which is opposite to the end mounted in the mounting plate, and particularly supported at the above-mentioned opposite end by a lattice-like or spider-like grid-shaped structure inside the housing of the separator. When the dividing or separating elements are provided with the central spindle, the central spindle at its end opposite to the receiving flange member is received in an opening of the spider structure. This construction has the advantage in the fact that all dividing or separating elements to be mounted on the mounting plate can be jointly inserted into the housing at its one side, and the ends of the central spindles can be inserted into the respective openings of the spiders. These openings can conically increase for the purpose of insertion.

In the above-described known arrangement there is, however, the difficulty in that the orientation of each individual dividing or separating element relative to the mounting plate is determined by the fact that the receiving flange member with its sealing face is uniformly sealingly pressed against the mounting plate. Thereby adjusted position of the longitudinal axes of the dividing or separating elements extends (taking into account the unavoidable manufacturing tolerances and also unavoidable bending of the mounting plate because of a pressure differential) not always exactly normal to the plane of the mounting plate. Thereby the free end of the central spindle not always coincides with the respective opening in the spider-like member. When this free end of the central spindle is now forced in the respective opening of the spider-like member, this will lead in many cases to a further bending load in the region of mounting to the mounting plate and an insufficient abutment of the receiving flange member against the mounting plate, which undesirably affects the sealing in this region.

SUMMARY OF THE INVENTION

Accordingly, it is an object of the present invention to provide an arrangement for mounting dividing or separating elements in a filtering water separator which avoids the disadvantages of the prior art.

More particularly, it is an object of the present invention to provide an arrangement which guarantees that when the free end of a central spindle is received in the respective opening of a spider-like element, an effective sealing in the region of the opening of a mounting plate takes place, without providing complicated construction of the dividing or separating elements or affecting the mounting possibilities thereof.

In keeping with these objects and with others which will become apparent hereafter, one feature of the present invention resides, briefly stated, in an arrangement for mounting dividing or separating elements in a filtering water separator, which has a stationary mounting plate provided with a plurality of openings, means for tensioning both ends of each of the elements and including a tensioning member axially abutting against the mounting plate and a central spindle member extending through the opening of the mounting plate and connected with the tensioning member, and a receiving member arranged to receive an end of the dividing or separating element, wherein the receiving member has a flange part axially spaced from the mounting plate, a projecting part extending with play into the opening of the mounting plate and sealed against the latter and the receiving member axially abuts against the tensioning member.

When the arrangement is designed in accordance with the present invention, the known axial tensioning between the receiving member and the mounting plate is dispensed with, inasmuch as the axial tensioning force for the dividing or separating element is transmitted from the receiving member to the tightening member, avoiding the mounting plate. The projecting part of the receiving member which extends in the central opening of the mounting plate transfer only vertical supporting force and carries the radial seal. Since the radial seal provides for sufficient sealing in the cylindrical opening even in condition of relatively great angular deviations, the support of the free end of the central spindle in the opening of the spider-like member does not encounter any difficulties. This is true even when the permissible manufacturing tolerances result in a relatively great angular deviation of the longitudinal axis of the dividing or separating element from the vertical relative to the mounting plate.

In accordance with another feature of the present invention, the flange part of the receiving member is connected with a sleeve surrounding the central spindle with the aid of a plurality of webs, the sleeve abutting against the tensioning member. Thereby, the central spindle is centered in the region of the flange part of the receiving member relative to the same.

In accordance with still another advantageous feature of the present invention, the sleeve part of the receiving member is arranged inside the dividing or separating element in spaced relationship with the flange part of the same and abuts against the tightening member with interposition of a spacer formed as a tubular member surrounding the central spindle. In such a construction, when the webs extend in inclined relationship to the flange part of the receiving member, the web does not reduce or reduce only insignificantly the inner opening of the flange part. Moreover, the dividing or separating elements are centered during mounting over the outer side of the inclined webs.

In accordance with a further advantageous feature of the present invention, the radial seal is formed as an O-ring seal. Thereby the sealing is provided by a very simple sealing member which is easy to mount and allows relatively great angular deviations or angular movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
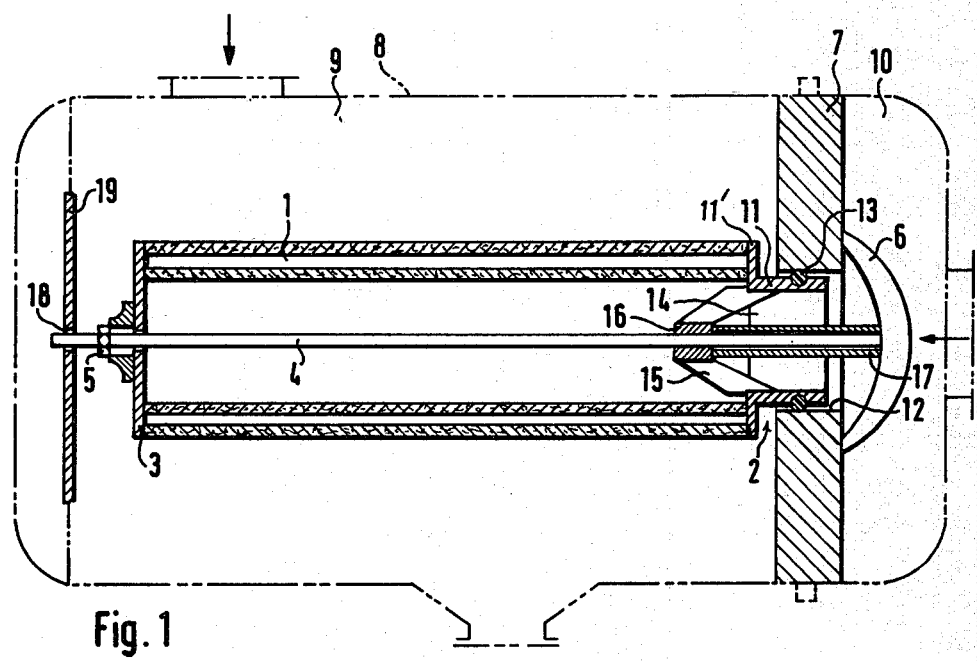
FIG. 1 is a schematic view showing an arrangement for mounting elongated dividing or separating elements in a filtering water separator, in accordance with the present invention.
Figure 2:
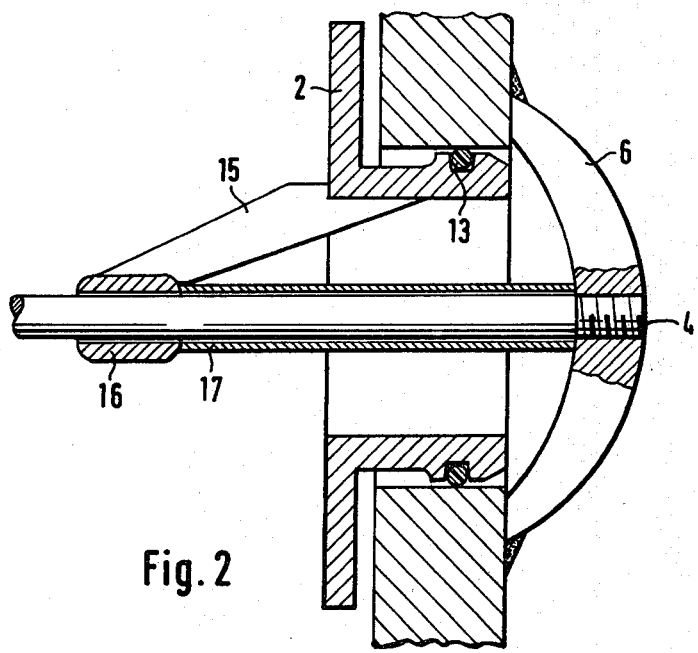
FIG. 2 is an enlarged view of the mounting arrangement in the region of a receiving member at one end of the dividing or separating element.

An arrangement shown in the drawing is utilized for mounting an elongated hollow cylindrical dividing or separating element identified by reference numeral 1 in a filtering water separator 4.

The element 1 extends between a receiving member 2 at its one end and a member 3 at its other end. A central spindle 4 with a nut 5 transfers a pulling force between the member 3 and a tensioning member 6 which is connected with a mounting plate 7 and is, for example, bracket-shaped. The mounting plate 7 subdivides a housing of the filtering water separator into an inlet chamber 9 and a main chamber 10.

The receiving member 2 has a flange part identified by reference numeral 11' and a projecting part 11 axially extending from the flange part 11' and formed of one-piece with the latter. The mounting plate 7 is provided with a plurality of cylindrical openings 12, and the projecting part 11 of the receiving member 2 extends in a respective one of the openings with play. The projecting part 11 is sealed against the mounting plate 7, or more particularly relative to a wall portion surrounding the opening 12, by an O-ring seal 13. The outer end face of the flange part 11' of the receiving member 2 is spaced from the mounting plate 7. The projecting part 11 of the receiving member 2 has a central through-going opening 14 for the fuel which passes through the dividing or separating element 1.

A plurality of webs 15 extend inwardly from the projecting part 11 in inclined relationship therewith and are distributed in a circumferential direction. The receiving member 2 is provided with a sleeve part 16 which is connected with the projecting part 11 by the above-mentioned webs 15. The sleeve part 16 surrounds the central spindle 4 and is axially displaceable relative to the latter. The sleeve 16 abuts against the tightening member 6 with interposition of a tubular spacer 17. The tubular spacer 17 also surrounds the central spindle 4 which is screwed in the tightening member 6. The projecting part 11, the flange part 11', the sleeve part 16 and the webs 15 may be of one-piece with each other.

When the nut 5 is tensioned against the member 3, the axial tensioning force for the dividing or separating element 1 is transmitted via the central spindle 4, the tightening member 6, the tubular spacer 7, the sleeve part 16, the webs 15 and the flange part 11' on the receiving member 2.

A free end portion of the central spindle 4 which extends outwardly through the nut 5 is received in an opening 18 of a spider-like member 19 which is shown in FIG. 1 as a plate. The member 19 is mounted in the housing 8. The dividing or separating element 1 is thereby supported at its one end in the opening 18, and at its other end in the opening 12.

In contrast to the simple example shown in FIG. 1, the filtering water separator can be provided with conventional several dividing elements through which the respective fluid flows from inside outwardly, and with several separating elements through which the respective fluid flows from outside inwardly.

It will be understood that each of the elements described above, or two or more together, may also find a useful application in other types of constructions differing from the types described above.

While the invention has been illustrated and described as embodied in an arrangement for mounting elongated dividing or separating elements in a filtering water separator it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for mounting elongated dividing or separating elements in a filtering water separator, comprising a stationary mounting plate provided with a plurality of openings each having an axis; means for tensioning both ends of each of the elements and including a tensioning member axially abutting against said mounting plate, and a central spindle member having two end portions of which one end portion is arranged to be connected with one end of each of the elements, whereas the other end portion extends through a respective one of said openings of said mounting plate and is connected with said tensioning member; and a receiving member arranged to receive the other end of a respective one of the elements and sealed against said mounting plate, said receiving member having a substantially radial flange part and a substantially axial projecting part, said projecting part of said receiving member extending with play into said one opening of said mounting plate and is sealed against the latter, said receiving member axially abutting against said tensioning member, and said flange part of said receiving member being axially spaced from said mounting plate.

2. An arrangement as defined in claim 1, wherein said openings in said mounting plate are formed as cylindrical openings.

3. An arrangement as defined in claim 1, wherein said mounting plate has a wall portion bounding each of said openings; and further comprising means for sealing said projecting part of each of said receiving members against the wall portion bounding a respective one of said openings.

4. An arrangement as defined in claim 3, wherein said sealing means of said projecting part of each of said receiving members is formed as an O-ring.

5. An arrangement as defined in claim 1, wherein said tensioning member is arranged axially outwardly of said mounting plate, said flange part of said receiving member being arranged axially inwardly of said mounting plate.

6. An arrangement as defined in claim 1, wherein said flange part and said projecting part of said receiving member are of one piece with one another.

7. An arrangement as defined in claim 1, wherein said sleeve part, said flange part, said projection part and said webs are of one piece with one another so that said receiving member is a one piece member.

8. An arrangement as defined in claim 1, wherein said receiving member has a sleeve part which surrounds said central spindle member and axially abuts against said tensioning member, said sleeve part of said receiving member being connected with said flange part; and further comprising means for connecting said sleeve part with said flange part.

9. An arrangement as defined in claim 8, wherein said connecting means includes a plurality of webs spaced from one another in a circumferential direction and extending between said sleeve part and said flange part in inclined relationship to the latter, so as to connect said parts with one another.

10. An arrangement as defined in claim 8, wherein each of the elements bounds an inner space; and further comprising a spacer, said sleeve part of said receiving member being arranged in the inner space of a respective one of the elements in spaced relationship with said flange part thereof and abutting against said tensioning member with interposition of said spacer.

11. An arrangement as defined in claim 10, wherein said spacer is tubular and surrounds said central spindle member.

12. An arrangement as defined in claim 11; and further comprising an end member arranged to receive the one end of each of the elements, the one end portion of said spindle member being adjustably connected with said end member.

* * * * *